United States Patent
Peng

(10) Patent No.: US 10,614,491 B2
(45) Date of Patent: Apr. 7, 2020

(54) CONTENT RATE DISPLAY ADJUSTMENT BETWEEN DIFFERENT CATEGORIES OF ONLINE DOCUMENTS IN A COMPUTER NETWORK ENVIRONMENT

(71) Applicant: Google Inc., Mountain View, CA (US)

(72) Inventor: Yefei Peng, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/360,365

(22) Filed: Nov. 23, 2016

(65) Prior Publication Data

US 2018/0143946 A1    May 24, 2018

Related U.S. Application Data

(63) Continuation of application No. 14/073,086, filed on Nov. 6, 2013, now abandoned.

(51) Int. Cl.
*G06Q 30/02* (2012.01)
*H04L 29/08* (2006.01)

(52) U.S. Cl.
CPC .......... *G06Q 30/0277* (2013.01); *H04L 67/20* (2013.01)

(58) Field of Classification Search
CPC .............. G06F 17/212; G06F 17/2247; G06Q 30/0277; H04L 67/20; H04L 67/02
USPC .................................................. 715/234, 238
See application file for complete search history.

(56) References Cited

U.S. PATENT DOCUMENTS

| | | | |
|---|---|---|---|
| 6,141,010 A | * | 10/2000 | Hoyle ........................ G06F 8/60 715/201 |
| 6,910,044 B2 | | 6/2005 | Weinberg et al. |
| 7,231,358 B2 | | 6/2007 | Singh et al. |
| 7,567,958 B1 | * | 7/2009 | Alspector .......... G06Q 30/0255 |
| 7,870,039 B1 | | 1/2011 | Dom et al. |
| 7,908,238 B1 | * | 3/2011 | Nolet ...................... G06N 7/005 706/52 |
| 7,921,052 B2 | | 4/2011 | Dabney et al. |
| 8,175,914 B1 | | 5/2012 | Benson et al. |
| 8,190,489 B2 | | 5/2012 | Sandholm et al. |
| 8,204,818 B1 | | 6/2012 | Aggarwal |
| 8,266,003 B1 | | 9/2012 | Mirchandani et al. |
| 8,271,325 B2 | | 9/2012 | Silverman et al. |
| 8,346,607 B1 | | 1/2013 | Benson et al. |
| 8,433,611 B2 | | 4/2013 | Lax et al. |
| 8,719,081 B1 | * | 5/2014 | Langrock ........... G06Q 30/0275 705/14.1 |

(Continued)

OTHER PUBLICATIONS

Ackley, M.,"4 paid search strategies to advertise your entire product catalog," http://searchengineland.com/4-paid-search-strategies-to-successfully-advertise-your-entire-product-catalog-172424, Sep. 26, 2013, page accessed Oct. 17, 2013, 3 pages.

(Continued)

*Primary Examiner* — Andrew R Dyer
(74) *Attorney, Agent, or Firm* — Foley & Lardner LLP

(57) ABSTRACT

The present disclosure discusses the adjustment of a rate of display between different types of content item categories. The system of the present disclosure can determine a content item's rate of display with a first category of content and with a second category of content. The system can determine a relationship between the display rates. If the display rates are outside of a predetermined range, the system can update the display parameters of the content categories.

20 Claims, 6 Drawing Sheets

(56) References Cited

U.S. PATENT DOCUMENTS

| | | |
|---|---|---|
| 2003/0018501 A1 | 1/2003 | Shan |
| 2005/0027590 A9 | 2/2005 | Gailey et al. |
| 2005/0028188 A1* | 2/2005 | Latona .................. G06Q 30/02 725/13 |
| 2005/0154637 A1 | 7/2005 | Nair et al. |
| 2005/0160002 A1 | 7/2005 | Roetter et al. |
| 2006/0041500 A1 | 2/2006 | Diana et al. |
| 2006/0069614 A1 | 3/2006 | Agarwal et al. |
| 2006/0184417 A1 | 8/2006 | Van Der Linden et al. |
| 2006/0224445 A1 | 10/2006 | Axe et al. |
| 2006/0224447 A1 | 10/2006 | Koningstein |
| 2007/0094072 A1 | 4/2007 | Vidals et al. |
| 2007/0162379 A1 | 7/2007 | Skinner |
| 2007/0265923 A1 | 11/2007 | Krassner et al. |
| 2007/0288317 A1 | 12/2007 | Gupta et al. |
| 2007/0294149 A1 | 12/2007 | Lu et al. |
| 2008/0140489 A1 | 6/2008 | Berkhin et al. |
| 2008/0275777 A1 | 11/2008 | Protheroe et al. |
| 2009/0006375 A1 | 1/2009 | Lax et al. |
| 2009/0048908 A1* | 2/2009 | Kaplan ................. G06Q 30/02 705/7.33 |
| 2009/0132353 A1 | 5/2009 | Maggenti et al. |
| 2009/0276329 A1 | 11/2009 | Sandholm et al. |
| 2010/0042421 A1 | 2/2010 | Bai et al. |
| 2010/0094712 A1 | 4/2010 | Lai |
| 2010/0138291 A1 | 6/2010 | Silverman et al. |
| 2010/0211460 A1 | 8/2010 | Agarwal et al. |
| 2010/0223141 A1 | 9/2010 | Spencer et al. |
| 2011/0015994 A1 | 1/2011 | Ramer et al. |
| 2011/0035277 A1 | 2/2011 | Kodialam et al. |
| 2011/0040616 A1 | 2/2011 | Kannan et al. |
| 2011/0071879 A1 | 3/2011 | Flockhart et al. |
| 2011/0071900 A1 | 3/2011 | Kamath et al. |
| 2011/0078000 A1 | 3/2011 | Ma et al. |
| 2011/0179033 A1 | 7/2011 | Mount et al. |
| 2011/0231264 A1 | 9/2011 | Dilling et al. |
| 2011/0231296 A1 | 9/2011 | Gross et al. |
| 2011/0238487 A1 | 9/2011 | Chang et al. |
| 2011/0258049 A1 | 10/2011 | Ramer et al. |
| 2011/0264516 A1* | 10/2011 | Lang ...................... G06Q 30/02 705/14.46 |
| 2011/0270673 A1 | 11/2011 | Lin et al. |
| 2012/0036024 A1 | 2/2012 | Mysen et al. |
| 2012/0041816 A1 | 2/2012 | Buchalter |
| 2012/0066065 A1 | 3/2012 | Switzer |
| 2012/0123856 A1 | 5/2012 | Paunikar et al. |
| 2012/0166452 A1 | 6/2012 | Tseng |
| 2012/0310729 A1 | 12/2012 | Dalto et al. |
| 2013/0018722 A1 | 1/2013 | Libby |
| 2013/0091019 A1* | 4/2013 | Mallon ............... G06Q 30/0251 705/14.68 |
| 2013/0159092 A1 | 6/2013 | Lahaie et al. |
| 2013/0204664 A1 | 8/2013 | Romagnolo et al. |
| 2013/0212108 A1 | 8/2013 | Armon-Kest et al. |
| 2013/0212608 A1 | 8/2013 | Cansler et al. |
| 2013/0238762 A1 | 9/2013 | Raleigh et al. |
| 2013/0339126 A1 | 12/2013 | Cui et al. |
| 2014/0006170 A1 | 1/2014 | Collette et al. |
| 2014/0100944 A1 | 4/2014 | Zhu et al. |
| 2014/0122221 A1 | 5/2014 | Jordan et al. |
| 2014/0122253 A1 | 5/2014 | Vassilvitskii et al. |
| 2014/0129351 A1* | 5/2014 | Ringdahl ........... G06Q 30/0275 705/14.71 |
| 2014/0222587 A1 | 8/2014 | Feldman et al. |
| 2014/0278855 A1 | 9/2014 | Clark et al. |
| 2017/0092278 A1 | 3/2017 | Evermann et al. |
| 2017/0110130 A1 | 4/2017 | Sharifi et al. |
| 2017/0110144 A1 | 4/2017 | Sharifi et al. |
| 2017/0132019 A1 | 5/2017 | Karashchuk et al. |
| 2017/0358301 A1 | 12/2017 | Raitio et al. |

OTHER PUBLICATIONS

Dent, A., "Product listing ads: How to maximize your returns," http://searchenginewatch.com/article/2263233/Product-Listing-Ads-How-to-Maximize-Your-Returns, Apr. 23, 2013, page accessed Oct. 17, 2013, 3 pages.

Google Help, "Understanding bidding basics." https://support.google.com/adwords/answer/2459326?hl=en, page accessed Jul. 23, 2014, 3 pags.

Google Inc., Target CPA Bidding: A New Way to Meet your ROI Goals with Conversion Optimizer, dated May 3, 2010, printed from Internet address: www.adwords.blogspot.com/2010/05/target-cpa-bidding-new-way-to-meet-your.html on Apr. 12, 2013, 2 pages.

Google Inc., Using Custom Scheduling, printed from Internet address: http://www.support.google.com/adwords/answer/2404244/?hl=en on Jan. 23, 2013, 6 pages.

Google, Inc., About Conversion Optimizer, printed from Internet address: www.support.google.com/adwords/answer/2471188?hl=en on Apr. 12, 2013, 4 pages.

Google, Inc., Enter Experimental Bids in AdWords Editor, printed from Internet address: http://support.google.com/adwords/editor/answer/1399246?hl=en on Jan. 23, 2013, 2 pages.

Google, Inc., Why Costs Might Exceed Your Daily Budget, printed from Internet address: http://support.google.com/adwords/answer/2375423?hl=en on Mar. 21, 2013, 3 pages.

International Search Report and Written Opinion dated Mar. 26, 2014, in PCT Application No. PCT/US2013/073328 (12 pages).

Marin Software, ROI-Based Campaign Management: Optimization Beyond Bidding, White Paper, Oct. 2009, 16 pages.

Vigneron, Benjamin, How to Determine Your Mobile & Geo Bid Multipliers for Enhanced Campaigns, Mar. 22, 2013, 7 pages.

"Walmart and Google to offer voice-enabled shopping", BBC News, Aug. 23, 2017 (10 pages).

Abrams, Help users find, interact & re-engage with your app on the Google Assistant, Google Developers Blog, Nov. 15, 2017, 16 pages.

Albrecht, "Alexa, How Can You Be Used in Restaurants?", the spoon, Dec. 10, 2017, 6 pages.

Barr, "AWS DeepLens—Get Hands-On Experience with Deep Learning With Our New Video Camera", AWS News Blog, Nov. 29, 2017, 11 pages.

Broussard, Mitchel, "Chatbot-Like Siri Patent Includes Intelligent Image, Video, and Audio Recognition within Messages", MacRumors, May 11, 2017 (7 pages).

Buckland et al., "Amazon's Alexa Takes Open-Source Route to Beat Google Into Cars", Bloomberg, Feb. 27, 2018, 6 pages.

Chen, Lulu Yilun, "Alibaba Challenges Google, Amazon With New Echo-Like Device", Bloomberg Technology, Jul. 5, 2017 (3 pages).

Churchill,Christine, "Best Practices for Google Enhanced PPC Campaigns", Jun. 19, 2013; Internet address: http://searchengineland.com/highlights-of-the-smx-advanced-session-on-ppc-enhanced-campaigns. 6 pages.

Clover, Juli, "Amazon and Google Want to Turn Their Smart Home Speakers Into Telephone Replacements", MacRumors, Feb. 15, 2017 (5 pages).

Coberly, "Apple patent filing reveals potential whispering Siri functionality", Techspot, Dec. 14, 2017, 4 pages.

Collins, et al., "Can Twitter Save Itself?", cnet, Apr. 26, 2017, reprinted from https://www.cnet.com/news/twitter-q1-2017-earnings/ on Aug. 22, 2017 (2 pages).

Crist, Ry, "Logitech Harmony's Alexa Skill just got a whole lot better", cnet, Jul. 13, 2017 (2 pages).

Estes, "Amazon's Newest Gadget Is a Tablet That's Also an Echo", Gizmodo, Sep. 19, 2017, 3 pages.

Forrest, Conner, "Essential Home wants to be bridge between Amazon's Alexa, Apple's Siri, and Google Assistant", TechRepublic, May 31, 2017 (10 pages).

Foxx, Chris, "Apple reveals HomePod smart speaker", BBC News, Jun. 5, 2017 (6 pages).

Gebhart, Andrew, "Google Assistant is spreading, but it needs its own Echo Dot", cnet, May 20, 2017 (7 pages).

(56) References Cited

OTHER PUBLICATIONS

Gebhart, Andrew, "Google Home to the Amazon Echo: 'Anything you can do . . . '", cnet, May 18, 2017 (7 pages).
Golgowski, Nina, "This Burger King Ad Is Trying to Control Your Google Home Device", Huffpost, Apr. 12, 2017 (7 pages).
Google Developers, "GoogleAssistant SDK" reprinted from https://developers.google.com/assistant/sdk/ on Aug. 22, 2017 (4 pages).
Google Help, Target Ads to Geographic Locations—AdWords Help, printed from Internet address: https://support.google.com/adwords/answer/1722043?hl=en on Jul. 23, 2014, 7 pages.
Google Inc., Products Feed Specification, printed from Internet address: http://www.support.google.com/merchants/bin/answer.py?hl=en&answer=188494#US, on Mar. 18, 2013, 6 pages.
Google Inc., Supported File Formats, printed from Internet address: http://www.support.google.com/merchants/bin/answer.py?hl=en&answer=160567, on Mar. 18, 2013, 1 page.
Gurman, et al., "Apple Is Manufacturing a Siri Speaker to Outdo Google and Amazon", Bloomberg, May 31, 2017 (5 pages).
Hardwick, Tim, "Facebook Smart Speaker Coming Next Year With 15-inch Touch Panel", MacRumors, Jul. 25, 2017 (5 pages).
Heater, "Amazon Alexa devices can finally tell voices apart", TechCrunch, Oct. 11, 2017, 6 pages.
International Preliminary Report on Patentability for PCT Application No. PCT/US2013/073328 dated Aug. 20, 2015, 6 pages.
Kelion, "Amazon revamps Echo smart speaker family", BBC News, Sep. 27, 2017, 11 pages.
Kelion, Leo, "Amazon's race to make Alexa smarter", BBC News, Jul. 28, 2017 (8 pages).
Krishna, "Jim Beam's smart decanter will pour you a shot when you ask", engadget, Nov. 29, 2017, 3 pages.
Lacy, "Improving search and advertising are the next frontiers for voice-activated devices", TechCrunch, Dec. 20, 2017, 13 pages.
Larson, Selena, "Google Home now recognizes your individual voice", CNN Money, San Francisco, California, Apr. 20, 2017 (3 pages).
Lee, Take Two for Samsung's troubled Bixby assistant, BBC News, Oct. 19, 2017, 6 pages.
Lee, Dave, "The five big announcements from Google I/O", BBC News, May 18, 2017 (9 pages).
Lund, Pamela, Mastering Google Product Feeds and Product Listing Ads $2013 Part 1, found at http://www.blueglass.com/blog/mastering-google-product-feeds-and-product-listing-ads-part-1/#comments, Dec. 28, 2013, 17 pages.
Nieva, Richard, "Google Home and eBay can tell you how much that's worth", cnet, Mar. 8, 2017 (3 pages).
Novet, et al., "Amazon is getting ready to bring Alexa to work", CNBC, Nov. 29, 2017, 4 pages.
Patently Apple, "Apple Patent Reveals a New Security Feature Coming to Siri", Apr. 4, 2017, reprinted from http://www.patentlyapple.com/patently-apple/2017/04/apple-patent-reveals-a-new-security-feature-coming-to-siri.html, on Aug. 22, 2017 (6 pages).
Patently Mobile, "The Patent behind Google Home's new Feature of Understanding Different Voices in the Home Surfaced Today", Apr. 20, 2017, reprinted from http://www.patentlymobile.com/2017/04/the-patent-behind-google-homes-new-feature-of-understanding-different-voices-in-the-home-surfaced-today.html, on Aug. 22, 2017 (3 pages).
Perez, "Alexa's 'Routines' will combine smart home control with other actions, like delivering your news and weather", TechCrunch, Sep. 28, 2017, 10 pages.
Perez, Sarah, "The first ad network for Alexa Skills shuts down following Amazon's policy changes", Tech Crunch, Jun. 15, 2017 (6 pages).
Porter, Jon, "Amazon Echo Show release date, price, news and features", Techradar, Jun. 26, 2017 (14 pages).
Pringle, "'I'm sorry to hear that': Why training Siri to be a therapist won't be easy", CBC News, Sep. 24, 2017, 3 pages.
Purcher, Jack, Today Google Home's Virtual Assistant can learn its Owner's voice for Security Reasons like Apple's Patent Pending Idea, Apr. 20, 2017, 4 pages.
Sablich, Justin, "Planning a Trip With the Help of Google Home", New York Times, May 31, 2017 (6 pages).
Seifert, Dan, "Samsung's new virtual assistant will make using your phone easier", The Verge, Mar. 20, 2017 (6 pages).
Sherr, Ian, "IBM built a voice assistant for cybersecurity", cnet, Feb. 13, 2017 (2 pages).
Siegal, Daniel, "IP Attys Load Up Apps' Legal Challenges At 'Silicon Beach'", Law360, Los Angeles, California, Feb. 2, 2017 (4 pages).
Smith, Dave, "The Amazon Echo got 2 incredibly useful features thanks to a new update", Business Insider, Jun. 1, 2017 (5 pages).
Unknown Author, "'Dolphin' attacks fool Amazon, Google voice assistants", BBC News, Sep. 7, 2017, 8 pages.
U.S. Corrected Notice of Allowance for U.S. Appl. No. 13/875,967 dated Feb. 8, 2017, 2 pages.
U.S. Notice of Allowance for U.S. Appl. No. 13/875,967 dated Jan. 23, 2017, 10 pages.
U.S. Notice of Allowance for U.S. Appl. No. 14/055,523 dated Jul. 6, 2016, 13 pages.
U.S. Notice of Allowance for U.S. Appl. No. 14/073,086 dated Dec. 16, 2015, 8 pages.
U.S. Office Action for U.S. Appl. No. 13/875,967 dated May 16, 2016, 8 pages.
U.S. Office Action for U.S. Appl. No. 13/875,967 dated Sep. 16, 2015, 49 pages.
U.S. Office Action for U.S. Appl. No. 13/875,967 dated Sep. 19, 2016, 9 pages.
U.S. Office Action for U.S. Appl. No. 13/911,898 dated Oct. 23, 2015, 9 pages.
U.S. Office Action for U.S. Appl. No. 14/055,523 dated Dec. 18, 2015, 16 pages.
U.S. Office Action for U.S. Appl. No. 14/073,086 dated Aug. 10, 2016, 12 pages.
U.S. Office Action for U.S. Appl. No. 14/106,401 dated Mar. 25, 2016, 14 pages.
U.S. Office Action for U.S. Appl. No. 14/106,412 dated Mar. 24, 2016, 12 pages.
U.S. Office Action for U.S. Appl. No. 15/282,648 dated Apr. 20, 2018, 12 pages.
Foghorn Labs, 10 Tips to Improve the Performance of Google Product Listing Ads, printed from Internet address: http://www.foghornlabs.com/2012/11/21/product-listing-ads-best-practices/, on Mar. 18, 2013, 5 pages.
Google, Inc., Google Plans to Combine Mobile & Desktop Ads $2013 Search Engine Watch (#SEW), printed from Internet address: http://searchenginewatch.com/article/2219061/Google-Plans-to-Combine-Mobile-Desktop, Oct. 22, 2012; 3 pages.
Palladino, "Garmin teamed up with Amazon to make a tiny Echo Dot for your car", ars Technica, Oct. 17, 2017, 2 pages.
AW4P: Internet Marketing & SEO Blog, printed from Internet address: http://aw4p.blogspot.com/2007/03/little-known-adwords-features-bid.html, Mar. 17, 2007, 5 pages.
Foghorn Labs, 10 Tips to Improve the Performance of Google Product Listing Ads, printed from Internet address: http://www.foghornlabs.oom/2012/11/21/product-listing-ads-best-practices/, on Mar. 18, 2013, 5 pages.
Gibbs, Samuel, "Your Facebook Messenger app is about to be filled with ads", The Guardian, Jul. 12, 2017 (3 pages).
Amazon, "Echo Look | Hands-Free Camera and Style Assistant", reprinted from https://www.amazon.com/gp/product/B0186JAEWK?ref%5F=cm%5Fsw%5Fr%5Ffa%5Fdp%5Ft2%5FC5oazbJTKCB18&pldnSite=1 on Apr. 27, (5 pages).
Final Office Action on U.S. Appl. No. 15/282,648 dated Nov. 16, 2018, p. 3-4.
Google, Inc., Google Plans to Combine Mobile & Desktop Ads $2013 Search Engine Watch (#SEW), printed from Internet address: http://searchenginewatch.com/article/2219061/Google-Plans-to-Combine-Mobile-Desktop, Miranda Miller, Oct. 22, 2012, 3 pages.
Johnston, "Amazon Whirlwind: New Echo, Plus, Spot, Connect, Fire TV Take the Stage", Twice, Sep. 27, 2017, 10 pages.
Koetsier, John, "Ads on Amazon Echo: Wendy's, ESPN, and Progressive Among Brands Testing", Forbes, May 11, 2017 (2 pages).

(56) References Cited

OTHER PUBLICATIONS

Willens, Max, "For publishers, Amazon Alexa holds promise but not much money (yet)", Digiday, Apr. 11, 2017 (3 pages).
Notice of Allowance on U.S. Appl. No. 15/282,648, dated Apr. 12, 2019 (9 pages).

* cited by examiner

US 10,614,491 B2

CONTENT RATE DISPLAY ADJUSTMENT BETWEEN DIFFERENT CATEGORIES OF ONLINE DOCUMENTS IN A COMPUTER NETWORK ENVIRONMENT

RELATED APPLICATIONS

The present application claims priority as a continuation application under 35 U.S.C. § 120 to U.S. patent application Ser. No. 14/073,086, filed Nov. 6, 2013, which is hereby incorporated by reference in its entirety.

BACKGROUND

Online documents can be of different categories, and content can be displayed on these online documents of various categories. The categories can identify whether the online document is a search result webpage from a search engine, a webpage, or an application. The content's rate of display with the different types of categories can become out of balance over time. For example, the content's display parameters can lead to the display of the content with one category of online documents more often than other categories.

SUMMARY

According to one aspect of the disclosure, a system to adjust a rate of display between different types of content item categories can include one or more processors. The system can determine that a first rate of display of a first category of content with a first type of first-party content is above a predefined range. The first category of content can have a set of display parameters. The system can also determine a second rate of display of a second category of content with the first type of first-party content is within the predefined range. The system can identify a ratio between the first rate of display and the second rate of display. The system can also determine an adjustment factor based on the ratio between the first rate of display and the second rate of display. The system can also update the set of display parameters associated with the first category of content responsive to the adjustment factor.

According to one aspect of the disclosure, a method to adjust a rate of display between different types of content item categories can include determining that a first rate of display of a first category of content with a first type of first-party content is above a predefined range. The first category of content can have a set of display parameters. The method can also include determining that a second rate of display of a second category of content with the first type of first-party content is within the predefined range. The method can include identifying a ratio between the first rate of display and the second rate of display. The method can include determining an adjustment factor based on the ratio between the first rate of display and the second rate of display. The method can include updating the set of display parameters associated with the first category of content responsive to the adjustment factor.

These implementations are mentioned not to limit or define the scope of the disclosure, but to provide an example of an implementation of the disclosure to aid in understanding thereof. Particular implementations may be developed to realize one or more of the following advantages.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Like reference numbers and designations in the various drawings indicate like elements.

DETAILED DESCRIPTION

Figure 1:
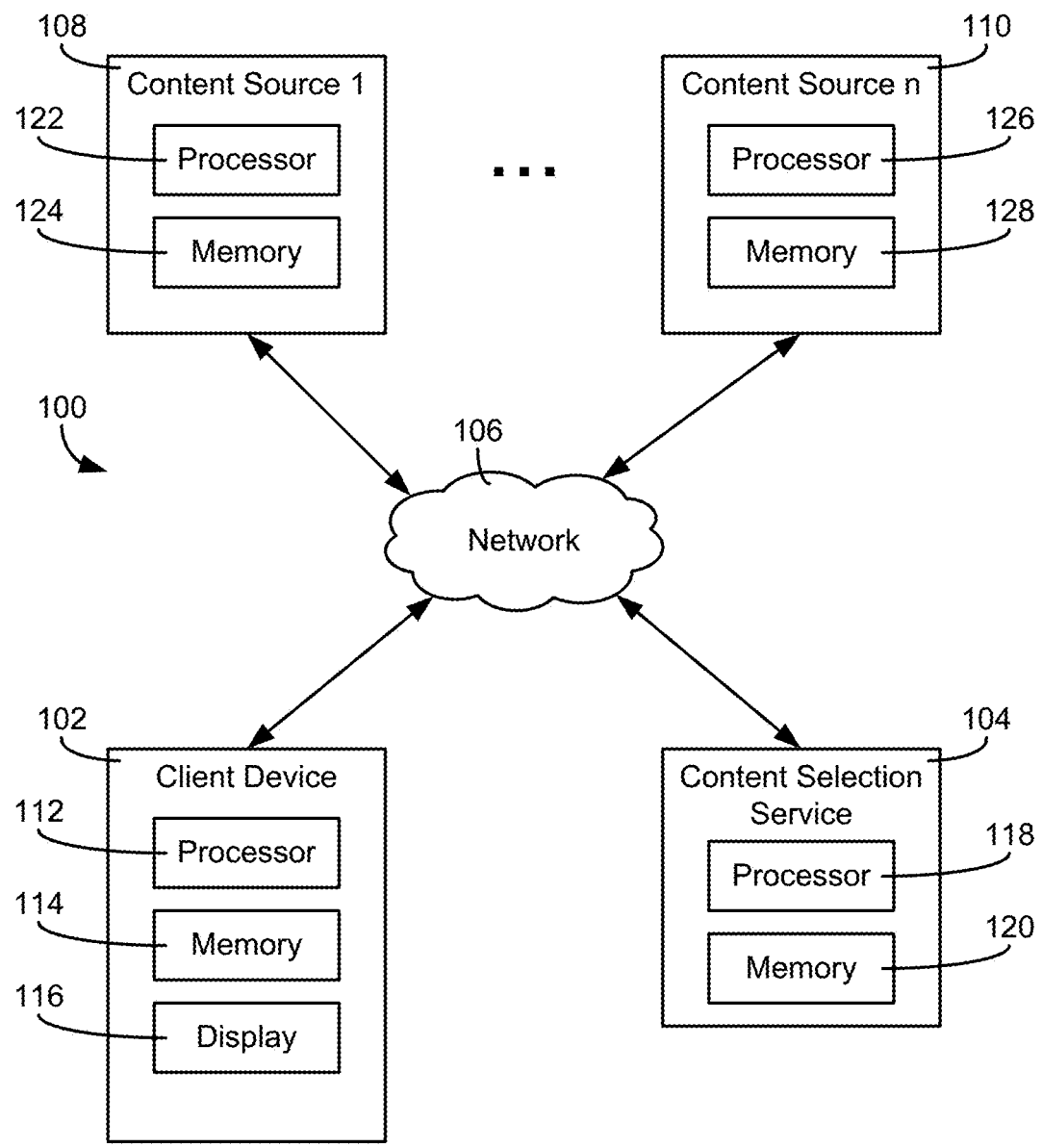
FIG. 1 is a block diagram of one implementation of a computer system.

According to some aspects of the present disclosure, a first-party content provider may allow a content selection service to determine which third-party content is to be provided in conjunction with the first-party provider's content. One or more third-party content providers may also use the content selection service to provide third-party content in conjunction with content from any number of first-party providers. In some cases, the content selection service may dynamically select which third-party content is presented in conjunction with a first-party provider's content. For example, a first-party webpage may display different third-party content during different visits to the webpage. The content selection service may determine which third-party content is to be provided based on any number of factors (e.g., whether the third-party content and first-party content relate to the same topic). For example, a third-party advertisement for golf clubs may appear on a webpage devoted to reviews of golf resorts.

In some cases, third-party content selected by a content selection service may be interactive. For example, the third-party content may be a clickable image (e.g., a hotlinked image) or hotlink configured to direct a web browser or other application to an associated webpage when the image or hotlink is selected. In response to an interaction with the third-party content at a client device, the content selection service may receive an indication of the interaction. For example, the content selection service may receive an indication that a device clicked on a third-party image and was redirected to the third-party content provider's website.

A content selection service may conduct a content auction to select which third-party content is to be presented with a piece of first-party content. For example, third-party content providers may place bids to compete for the ability to place third-party content with a particular piece of first-party content. In some cases, an auction bid to place interactive content may correspond to an amount of money the provider is willing to pay if an interaction with the content occurs after presentation (e.g., the user clicks on the content). Such bids are typically referred to as cost per click (CPC) bids.

According to various implementations, a content selection service may include an autobidder function that automatically generates and places content auction bids on behalf of a third-party content provider using auction parameters specified by the content provider. For example, the selection service may generate bids for an advertiser based on a monthly budget specified by the advertiser. In turn, the content selection service may generate bids on behalf of the content provider in accordance with a particular goal of the provider. For example, the content selection service may generate auction bids that maximize the number of clicks associated with the provider's content, minimize the CPC realized by the content provider, or achieve another such goal. The content selection service may also conduct content auctions for different types of first-party content. In other words, the types of first-party content that are auctioned by the service may fall under any number of classifications. In various implementations, first-party content may be classified as search results, display webpages (e.g., another first-party webpage that does not contain search results), applications (e.g., an advertisement may be placed within a game by the selection service, or the like.

In some cases, an auction-related metric for one type of first-party content may differ between different types of first-party content, when an autobidder function is used. For example, use of a selection service's autobidder may result in an advertiser's CPC to be much higher for content placements with search results than the advertiser's CPC for placements with display webpages. According to various implementations, the content selection service may be configured to adjust a content provider's content auction bids for one type of device relative to another such that the provider's CPCs across different device types are within a threshold range. For example, assume that the provider's CPC for search-related content placements is $1 and $2 to place content with display webpages. The content selection service may adjust the auction parameters used by the autobidder to generate bids on behalf of the content provider (e.g., by decreasing the provider's bids for placements on display webpages) in an effort to even out the CPC values for the different types of first-party content.

Referring to FIG. 1, a block diagram of a computer system 100 in accordance with a described implementation is shown. System 100 includes a client device 102 which communicates with other computing devices via a network 106. Client device 102 may execute a web browser or other application (e.g., a video game, a messenger program, a media player, a social networking application, etc.) to retrieve content from other devices over network 106. For example, client device 102 may communicate with any number of content sources 108, 110 (e.g., a first content source through nth content source). Content sources 108, 110 may provide webpage data and/or other content, such as images, video, and audio, to client device 102. Computer system 100 may also include a content selection service 104 configured to select third-party content to be provided to client device 102. For example, content source 108 may provide a first-party webpage to client device 102 that includes additional third-party content selected by content selection service 104.

Network 106 may be any form of computer network that relays information between client device 102, content sources 108, 110, and content selection service 104. For example, network 106 may include the Internet and/or other types of data networks, such as a local area network (LAN), a wide area network (WAN), a cellular network, satellite network, or other types of data networks. Network 106 may also include any number of computing devices (e.g., computer, servers, routers, network switches, etc.) that are configured to receive and/or transmit data within network 106. Network 106 may further include any number of hardwired and/or wireless connections. For example, client device 102 may communicate wirelessly (e.g., via WiFi, cellular, radio, etc.) with a transceiver that is hardwired (e.g., via a fiber optic cable, a CAT5 cable, etc.) to other computing devices in network 106.

Client device 102 may be any number of different types of user electronic devices configured to communicate via network 106 (e.g., a laptop computer, a desktop computer, a tablet computer, a smartphone, a digital video recorder, a set-top box for a television, a video game console, combinations thereof, etc.). In some implementations, the type of client device 102 may be categorized as being a mobile device, a desktop device (e.g., a device intended to remain stationary or configured to primarily access network 106 via a local area network), or another category of electronic devices (e.g., tablet devices may be a third category, etc.). Client device 102 is shown to include a processor 112 and a memory 114. Memory 114 may store machine instructions that, when executed by processor 112 cause processor 112 to perform one or more of the operations described herein. Processor 112 may include one or more microprocessors, application specific integrated circuits (ASICs), field programmable gate arrays (FPGAs), other forms of processing circuitry, or combinations thereof. Memory 114 may include, but is not limited to, electronic, optical, magnetic, or any other storage or transmission device capable of providing processor 112 with program instructions. Memory 114 may include a floppy disk, CD-ROM, DVD, magnetic disk, memory chip, ROM, RAM, EEPROM, EPROM, flash memory, optical media, or any other suitable memory from which processor 112 can read instructions.

Client device 102 may include one or more user interface devices. A user interface device may be any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to the housing of client device 102 (e.g., a built-in display, microphone, etc.) or external to the housing of client device 102 (e.g., a monitor connected to client device 102, a speaker connected to client device 102, etc.), according to various implementations. For example, client device 102 may include an electronic display 116, which displays webpages and other data received from content sources 108, 110 and/or content selection service 104. In various implementations, display 116 may be located inside or outside of the same housing as that of processor 112 and/or memory 114. For example, display 116 may be an external display, such as a computer monitor, television set, or any other stand-alone form of electronic display. In other examples, display 116 may be integrated into the housing of a laptop computer, mobile device, or other form of computing device having an integrated display.

Content sources 108, 110 may be one or more electronic devices connected to network 106 that provide content to devices connected to network 106. For example, content sources 108, 110 may be computer servers (e.g., FTP servers, file sharing servers, web servers, etc.) or combinations of servers (e.g., data centers, cloud computing platforms, etc.). Content may include, but is not limited to, webpage data, a text file, a spreadsheet, images, search results, other forms of electronic documents, and applications executable by client device 102. For example, content source 108 may be an online search engine that provides search result data to client device 102 in response to a search query. In another example, content source 110 may be a first-party web server that provides webpage data to client device 102 in response to a request for the webpage. Similar to client device 102, content sources 108, 110 may include processors 122, 126 and memories 124, 128, respectively, that store program instructions executable by processors 122, 126. For example, memory 124 of content source 108 may include instructions such as web server software, FTP serving software, and other types of software that cause content source 108 to provide content via network 106.

According to various implementations, content sources 108, 110 may provide webpage data to client device 102 that includes one or more content tags (e.g., one or more scripts or other instructions included in the webpage data). In general, a content tag may be any piece of webpage code associated with the action of including third-party content with a first-party webpage. For example, a content tag may define a slot on a webpage for third-party content, a slot for out of page third-party content (e.g., an interstitial slot), whether third-party content should be loaded asynchronously or synchronously, whether the loading of third-party content should be disabled on the webpage, whether third-party content that loaded unsuccessfully should be refreshed, the network location of a content source that provides the third-party content (e.g., content sources 108, 110, content selection service 104, etc.), a network location (e.g., a URL) associated with clicking on the third-party content, how the third-party content is to be rendered on a display, a command that causes client device 102 to set a browser cookie (e.g., via a pixel tag that sets a cookie via an image request), one or more keywords used to retrieve the third-party content, and other functions associated with providing third-party content with a first-party webpage. For example, content source 108 may provide webpage data that causes client device 102 to retrieve third-party content from content selection service 104. In another implementation, content may be selected by content selection service 104 and provided by content source 108 as part of the first-party webpage data sent to client device 102. In a further example, content selection service 104 may cause client device 102 to retrieve third-party content from a specified location, such as memory 114 or content sources 108, 110.

Content selection service 104 may also be one or more electronic devices connected to network 106. Content selection service 104 may be a computer server (e.g., an FTP server, a file sharing server, a web server, etc.) or a combination of servers (e.g., a data center, a cloud computing platform, etc.). Content selection service 104 may have a processor 118 and a memory 120 that stores program instructions executable by processor 118. In various cases, processor 118 may represent a single processor or a combination of processors in electronic communication with one another. Similarly, memory 120 may represent a single memory device or a combination of memory devices in communication with processor 118.

Content selection service 104 may be configured to select third-party content for client device 102 (i.e., content selection service 104 may provide a third-party content selection service). In one implementation, the selected third-party content may be provided by content selection service 104 to client device 102 via network 106. For example, content source 110 may upload the third-party content to content selection service 104. Content selection service 104 may then provide the third-party content to client device 102 to be presented in conjunction with first-party content provided by any of content sources 108, 110. In other implementations, content selection service 104 may provide an instruction to client device 102 that causes client device 102 to retrieve the selected third-party content (e.g., from memory 114 of client device 102, from content source 110, etc.). For example, content selection service 104 may select third-party content to be provided as part of a first-party webpage being visited by client device 102 or within a first-party application being executed by client device 102 (e.g., within a game, messenger application, etc.).

In some implementations, content selection service 104 may be configured to select content based on a device identifier associated with client device 102. In general, a device identifier refers to any form of data that may be used to represent a device or a piece of software that receives content selected by content selection service 104. In some implementations, a device identifier may be associated with one or more other device identifiers (e.g., a device identifier for a mobile device, a device identifier for a home computer, etc.). Device identifiers may include, but are not limited to, cookies, device serial numbers, mobile device identifiers, international mobile station equipment identity (IMEI) numbers, media access control (MAC) addresses, telephone numbers, other hardware or software-based numbers, user profile data, network addresses, combinations thereof, and identifiers derived therefrom. For example, a cookie set on client device 102 may be used to identify client device 102 to content selection service 104 within a web browser application on client device 102.

Content selection service 104 may be configured to allow the user of client device 102 to control which information about the user is collected and used by content selection service 104 via a device identifier. In addition, to the extent that content selection service 104 does collect and use information about the user, the data may be anonymized such that the user's identity cannot be determined by analyzing the collected data. In other words, the user of client device 102 may control what types of information about the user is collected by content selection service 104 and how the information is used. In one implementation, the user of client device 102 may set one or more preferences (e.g., as part of an online profile) that control how content selection service 104 collects and uses information about the user. In another implementation, content selection service 104 may set a cookie or other device identifier on client device 102 that signifies that the user of client device 102 has elected not to allow content selection service 104 to store information regarding him or her.

With the user's permission, content selection service 104 may receive location information from client device 102. The location information may be determined by client device 102 itself, by content selection service 104, or by another device on network 106. In some cases, client device 102 may include location-determining hardware, such as a global positioning system (GPS) receiver. In further cases, client device 102 may utilize triangulation or another technique to determine its location using network signals received by client device 102 (e.g., cellular signals, etc.). In some cases, client device 102, content selection service 104, or another device may determine the location of client device 102 based on a network access point used by client device 102. For example, if client device 102 accesses network 106 via a WiFi hotspot associated with a particular coffee shop, any of the devices in system 100 may use this information to determine that the location of client device 102 is in or near the coffee shop. In some implementations, a content tag of a webpage (e.g., an embedded webpage script) may cause client device 102 to report its location to content selection service. In further implementations, a stand-alone application (e.g., a mobile application) executed by client device 102 may report the location of client device 102 to content selection service 104.

If the user of client device 102 has elected to allow content selection service 104 to use information regarding himself or herself, content selection service 104 may use this information as selection criteria to select third-party content for client device 102. Example selection criteria may include, but is not limited to, a location of client device 102, an identified topic of a webpage visited by client device 102, a search query provided by client device 102 to a search engine, a language used by client device 102, combinations thereof, or the like. For example, assume that client device 102 provides a search query of "nearby restaurants" to an online search engine (e.g., content source 108). The search query may also include the current location of client device 102. Based on the relative distance between client device 102 and restaurants associated with third-party content managed by content selection service 104, content selection service 104 may determine whether or not a particular piece of third-party content is eligible for presentation with the search results. For example, content selection service 104 may determine that an advertisement for a restaurant within one mile of the location of client device 102 is eligible for presentation with the search results, but that an advertisement for a restaurant located in another country entirely is not eligible for presentation with the search results. In some implementations, content selection service 104 may determine whether third-party content is eligible for selection based on the first-party content itself (e.g., a topic identified on a content webpage, within search results, etc.). In other words, content selection service 104 may be configured to select third-party content that may be of relevance to the user of client device 102.

Content selection service 104 may be configured to conduct a content auction among third-party content providers to determine which third-party content is to be provided to client device 102. For example, content selection service 104 may conduct a real-time content auction in response to client device 102 requesting first-party content from one of content sources 108, 110 or by executing a first-party application. Content selection service 104 may use any number of factors to determine the winner of the auction. For example, the winner of a content auction may be based in part on the third-party provider's bid and/or a quality score for the third-party provider's content (e.g., a measure of how likely the user of client device 102 is to click on the content).

Content selection service 104 may include an autobidder feature configured to generate content auction bids on behalf of a third-party content provider based in part on auction parameters specified by the content provider. Such parameters may be stored as part of an account of the provider and used by content selection service 104 to control how and when the provider participates in content auctions. An account of a provider may include any number of bid-related parameters, such as a minimum bid amount, a maximum bid amount, a target bid amount, or one or more budget amounts (e.g., a daily budget, a weekly budget, a total budget, etc.). In some cases, a bid amount may correspond to the amount the third-party provider is willing to pay in exchange for their content being presented at client device 102. In other words, the bid amount may be on a cost per impression or cost per thousand impressions (CPM) basis. In further cases, a bid amount may correspond to a specified action being performed in response to the third-party content being presented at a client device. For example, a bid amount may be a monetary amount that the third-party content provider is willing to pay, should their content be clicked on at the client device, thereby redirecting the client device to the provider's webpage. In other words, a bid amount may be a CPC bid amount. In another example, the bid amount may correspond to an action being performed on the third-party provider's website, such as the user of client device 102 making a purchase. Such bids are typically referred to as being on a cost per acquisition (CPA) or cost per conversion basis.

Content selection service 104 may receive an indication of a content interaction or other event (e.g., the occurrence of a conversion) associated with the placement of third-party content. For example, content selection service 104 may receive data indicative of the user of client device 102 clicking on a piece of third-party content either directly from client device 102 or from one of content sources 108-110. Content selection service 104 may use this information for purposes of billing a third-party content provider. For example, content selection service 104 may charge a third-party content provider an amount corresponding to the provider's CPC bid, if the provider's content is presented on client device 102 and clicked. In some implementations, the actual bid amount submitted on behalf of a third-party content provider may differ from the actual amount of money that content selection service 104 charges the provider. In one implementation, content selection service 104 may conduct a second price auction in which the winning content provider in the auction only pays the next highest bid amount. In another implementation, content selection service 104 may apply a discount to bids submitted by a content provider in a content auction.

Content selection service 104 may generate metrics regarding the placement of third-party content. The metrics may include, for example, the number of times a provider's content was selected for presentation (e.g., an impression count), the number of times the provider's content was clicked (e.g., a click count), a click-through rate (e.g., the ratio of clicks to impressions), a conversion rate (e.g., the ratio of conversions to impressions), an average bid amount submitted by the provider, an average of actual CPCs, or any other metric that may be computed using the results of the content auctions. Content selection service 104 may include any calculated metrics, auction parameters, or the like in a report generated for a third-party content provider. For example, a particular advertiser may access a report via content selection service 104 that reports on how well the provider's advertising campaign is performing.

In some cases, content selection service 104 may group first-party content according to different categories. In various implementations, content selection service 104 may classify first-party content as search content or display content. In general, search content refers to first-party content provided by an online search engine that aggregates content across different content sources. For example, content selection service 104 may content a content auction to place an advertisement with search content that includes hyperlinks to different webpage selected by the search engine in response to a search query. As used herein, display content generally refers to any first-party webpage or other form of first-party content that is not generated by a search engine. In some cases, a first-party display webpage may itself include search results. However, these search results are typically internal to the website and do not link to other content sources. For example, a particular website devoted to the topic of golf may include a search feature that allows a user to search for golf-related articles on the website. While the webpage displaying the search results may include hyperlinks to other webpages of the website, the webpage itself may be classified as a display webpage since the links remain internal to the website (e.g., the search feature of the website is not a true online search engine that aggregates content from different sources). Another distinction between search content and display content may lie in how content selection service 104 selects third-party content for placement with the different content types. For example, content selection service 104 may base the selection of third-party content for presentation with search content on keywords in the search query itself, whereas content selection service 104 may base the selection of third-party content for presentation on a display webpage on a topic identified on the webpage.

According to various implementations, content selection service 104 may compare performance metrics of a content provider for different types of first-party content. In one implementation, content selection service 104 may compare the ratio or difference between the metrics to a predefined range or threshold value. For example, content selection service 104 may determine whether the ratio of CPC metrics for a third-party content provider across different types of first-party content is less than 0.7 or greater than 1.3 (e.g., whether the CPC values across content types differ by more than 30%). In some implementations, content selection service 104 may adjust a bid amount used on behalf of the content provider for one type of first-party content. For example, if the provider's CPC for placements with search content is more than 30% below the provider's CPC for placements on non-search related webpages, content selection service 104 may adjust down the provider's bids for non-search related webpages or adjust up the provider's bids for search related webpages.

In some implementations, content selection service 104 may adjust a bid amount for a particular type of first-party content by adjusting the provider's maximum bid for the type of first-party content. For example, if content selection service 104 determines that a third-party content provider's CPC for search-related placements is too high, it may decrease the provider's maximum bid used to generate auction bids for search-related placements. In one implementation, content selection service 104 may use the following relationship to adjust the maximum bid for one type of first-party content:

$$\text{max\_bid}_{display} = k * CPC_{search}$$

where $\text{max\_bid}_{display}$ is the maximum bid amount used by the autobidder for display content placements, $CPC_{search}$ is the recent CPC for search content placements, and k is an adjustment factor used to adjust the maximum bid for display content. To adjust a performance metric associated with a particular type of first-party content, content selection service 104 may adjust the k factor, thereby changing the maximum bid amount used by a content provider for display content or vice-versa. In doing so, the bids placed by the autobidder of content selection service 104 on behalf of the content provider may be adjusted upwards or downwards, accordingly.

In some cases, it may be assumed that the adjustment factor k described above proportionally affects an auction performance metric of a third-party content provider. For example, it may be assumed that the change in CPC values to place third-party content with display content is as follows:

$$\frac{CPC_{display\_new}}{CPC_{display\_old}} = f\left(k_{old}, CPC_{display\_old}, \frac{k_{new}}{k_{old}}\right)$$

where $CPC_{display\_old}$ is the provider's old CPC for display content, $CPC_{display\_new}$ is the provider's new CPC for display content that results from a change in the provider's bids, $k_{old}$ is the old adjustment factor used to relate CPC values across different first-party content types, and $k_{new}$ is the new adjustment factor. In one implementation, content selection service 104 may treat this relationship as a linear relationship. For example, content selection service 104 may use the following relationship to affect the provider's CPC by adjusting the provider's bid amounts:

$$\frac{CPC_{display\_new}}{CPC_{display\_old}} = \frac{k_{new}}{k_{old}}$$

where a change in the adjustment value results in a proportionate change in the provider's CPC value. In other implementations, content selection service 104 may relate changes in the k factor to changes in the CPC value as an affine transformation, a weighted function (e.g., an exponentially weighted function, etc.), or using any other relationship.

Content selection service 104 may use the relationship been changes in the adjustment factor k to changes in the provider's CPC values to keep the provider's CPC ratio across different content types within a particular range or close to a target CPC ratio. For example, content selection service 104 may operate to ensure that the CPC ratio between content types falls within a range corresponding to a +/−30% variation (e.g., the CPCs for display and search placements do not vary by more than 30%). Any other positive or negative threshold may be used to define the acceptable range, in various implementations. If the variation between CPC values for different content types (e.g., display content, search content, etc.) differs by an amount greater than the acceptable range, content selection service 104 may adjust the k value shown above. In doing so, the maximum bid for one of the content types may be adjusted, thereby altering its CPC. For example, if an advertiser's CPC for content placements is significantly higher than the advertiser's CPC for search placements (e.g., the difference in CPCs is outside of the acceptable range), content selection service 104 may decrease the k factor used, thereby lowering the advertiser's maximum bid amount for content placements and lowering the advertiser's CPC for content placements.

Content selection service 104 may analyze the raw CPC ratio between content types and/or a modified CPC ratio between content types, to determine whether the ratio falls within an acceptable range. For example, content selection service 104 may analyze raw CPC values that correspond to the actual bids submitted by a content provider. In another example, content selection service 104 may analyze the modified CPC values that correspond to the actual cost to the provider (e.g., as a result of a second price auction, a discount given to the provider, etc.). In some cases, content selection service 104 may analyze both types of CPC ratios to ensure compliance with one or more ranges. For example, content selection service 104 may ensure that the raw CPC ratio between content types is less than or equal to 1.0 while content selection service 104 may also ensure that the modified CPC ratios between content types is less than or equal to 1.3.

In some implementations, content selection service 104 may also use a smoothing factor to adjust the value of k. In many cases, the assumption that a change to k will result in a proportional change to the CPC for a content type is not correct. For example, sudden changes in the CPC ratio across content types or oscillations in the CPC ratio may result in a change in the CPC for one content type that is not proportional to the change in the k factor. In one implementation, content selection service may calculate a momentum term as follow:

$$momentum = \alpha * \Delta k_{previous}$$

where $0 \leq \alpha \leq 1$ and $\Delta k_{previous}$ is the previous change made to the k factor. Content selection service 104 may use the calculated momentum to determine a new, finalized k factor as follow:

$$new\_k_{final} = smoothing\_factor * k_{current} + (1 - smoothing\_factor) * k_{new} + \alpha * \Delta k_{previous}$$

where smoothing_factor and $\alpha$ are values selected to reduce the impact of CPC oscillations or sudden CPC changes and new_$k_{final}$ is the finalized k value used by content selection service 104 to adjust a content provider's CPC ratio across different content types.

Content selection service 104 may utilize auction result data from any time period or time periods to calculate the CPC ratio between content types. In one implementation, content selection service 104 may calculate the CPC ratio between content types and adjust the maximum bid for one of the content types on a periodic basis. For example, content selection service 104 may use auction data from the previous day, week, two weeks, month, etc., to calculate a content provider's CPCs and to adjust the provider's maximum bids, if needed. In other implementations, content selection service 104 may recalculate the provider's CPCs and adjust the provider's maximum bids on a real time or near real time basis (e.g., after each auction).

In various implementations, content selection service 104 may distinguish auction metrics based on device type. For example, In one example of operation, assume that content selection service 104 determines that a provider has a current CPC of $2 for content placements, a recent CPC of $1 for search placements, a current k factor of 0.8, and a current maximum bid of $3 for content placements. In such a case, content selection service 104 may determine that the CPC ratio between content and search placements is 2.0, which is greater than an accepted range. Thus, the provider's CPC for content placements is too high and that the ideal CPC ratio between content types is 1.0. To decrease the CPC ratio across content types, content selection service 104 may perform the following calculations:

$$CPC_{display\_ideal} =$$

$$CPC_{search\_recent} = \frac{CPC_{display\_recent}}{CPC\_ratio_{recent}} = \frac{CPC_{display\_recent}}{2} = 1$$

$$k_{new} = k_{current} * \frac{CPC_{display\_ideal}}{CPC_{display\_recent}} = 0.8 * \frac{1}{2} = 0.4$$

smoothing_factor = 0.4; $\alpha = 0.5$; $\Delta k_{previous} = 0.1$ $$new\_k_{final} =$$

$$smoothing\_factor * k_{current} + (smoothing\_factor - 1) * k_{new} + \alpha * \Delta k_{previous}$$

$$new\_k_{final} = 0.4 * 0.8 + (1 - 0.4) * 0.6 + 0.5 * 0.1 =$$

$$0.32 + 0.36 + 0.05 = 0.73$$

$$max\_bid_{display} = new\_k_{final} * CPC_{search\_recent} = 0.73 * \$1 = \$0.73$$

Content selection service 104 may then use the adjusted maximum bid for display content as part of an autobidder function that generates bids for the content provider automatically.

According to various implementations, content selection service 104 may adjust a CPC ratio between content types for a content provider across any logical grouping of bids. For example, content selection service 104 may use the following hierarchy to denote the levels of a content provider's account: country→country×language→country×language×category→campaign. In one implementation, content selection service 104 may start at the lowest level to determine whether there are sufficient auction metrics (e.g., bids, clicks, etc.) to reliably calculate a CPC value. For example, content selection service 104 may require at least fifty clicks to determine a reliable CPC value. If the lowest level does not contain enough clicks, content selection service 104 may include clicks from the next highest level and so on until the required number of clicks is reached. Once the threshold number of clicks is reached to calculate a CPC value reliably, content selection service 104 may or may not include auction metrics from higher levels, in various implementations. In some implementations, content selection service 104 may calculate different CPC ratios for some or all of the different levels of the account hierarchy. In one implementation, clicks from a higher level may be excluded by content selection service 104 if the number of clicks from a lower level is above a threshold amount. In another implementation, content selection service 104 may calculate different k factors based on including or excluding clicks from a given level. In such a case, content selection service 104 may combine the different k factors to determine the finalized k factor. In one implementation, content selection service 104 may apply a weighting to one or more of the k factors at the different levels to determine an overall k factor (e.g., a k factor for a level having a small number of clicks may be weighted lower than a k factor for a level having a high number of clicks).

Content selection service 104 may also determine one or more metrics to evaluate the CPC ratios of third-party content providers across different content types. In one implementation, content selection service 104 may determine a CPC ratio bias value as follows:

$$CPC\_ratio\_bias = CPC\_ratio_{true} - CPC\_ratio_{ideal}$$

where CPC_ratio$_{true}$ is a provider's actual CPC ratio and CPC_ratio$_{ideal}$ is the target CPC ratio used by content selection service 104 (e.g., a 1:1 mapping between the CPCs of the different content types, etc.). Another metric that may be determined by content selection service 104 is a relative CPC bias value as follows:

$$relative\_CPC\_bias = \frac{CPC_{true} - CPC_{ideal}}{CPC_{ideal}} = \frac{CPC_{true} - CPC_{ideal}}{CPC\_ratio_{ideal} * CPC_{search}}$$

where CPC$_{true}$ is the CPC for display content, CPC$_{ideal}$ is the ideal CPC for the display content, and CPC$_{search}$ is the CPC for search content. In yet another implementation, content selection service 104 may also calculate a variance of the CPC ratio bias as follows:

$$Variance\_CPC\_ratio\_bias = Var(CPC_{true} - CPC_{ideal})$$

These metrics may be calculated by content selection service 104 at any number of different levels of the third-party content providers' accounts. For example, content selection service 104 may calculate these metrics at the country, language, category, etc., level of the providers' accounts. Content selection service 104 may also determine these metrics for any time period or set of time periods (e.g., daily, weekly, biweekly, monthly, etc.). In one implementation, content selection service 104 may compare metrics across different content providers to evaluate how close each provider's CPC ratio is to the ideal ratio. For example, content selection service 104 may determine how many providers or campaigns are within 5%, 10%, 20%, etc. of the ideal CPC ratio. Content selection service 104 may also generate one or more reports based on the CPC ratio metrics. For example, content selection service 104 may generate a monthly report on how close the content providers' CPC ratios are to the ideal, how quickly new providers' campaigns converge to the ideal CPC (e.g., via adjusting their maximum bid amounts for one of the content types), or any other report.

Figure 2:
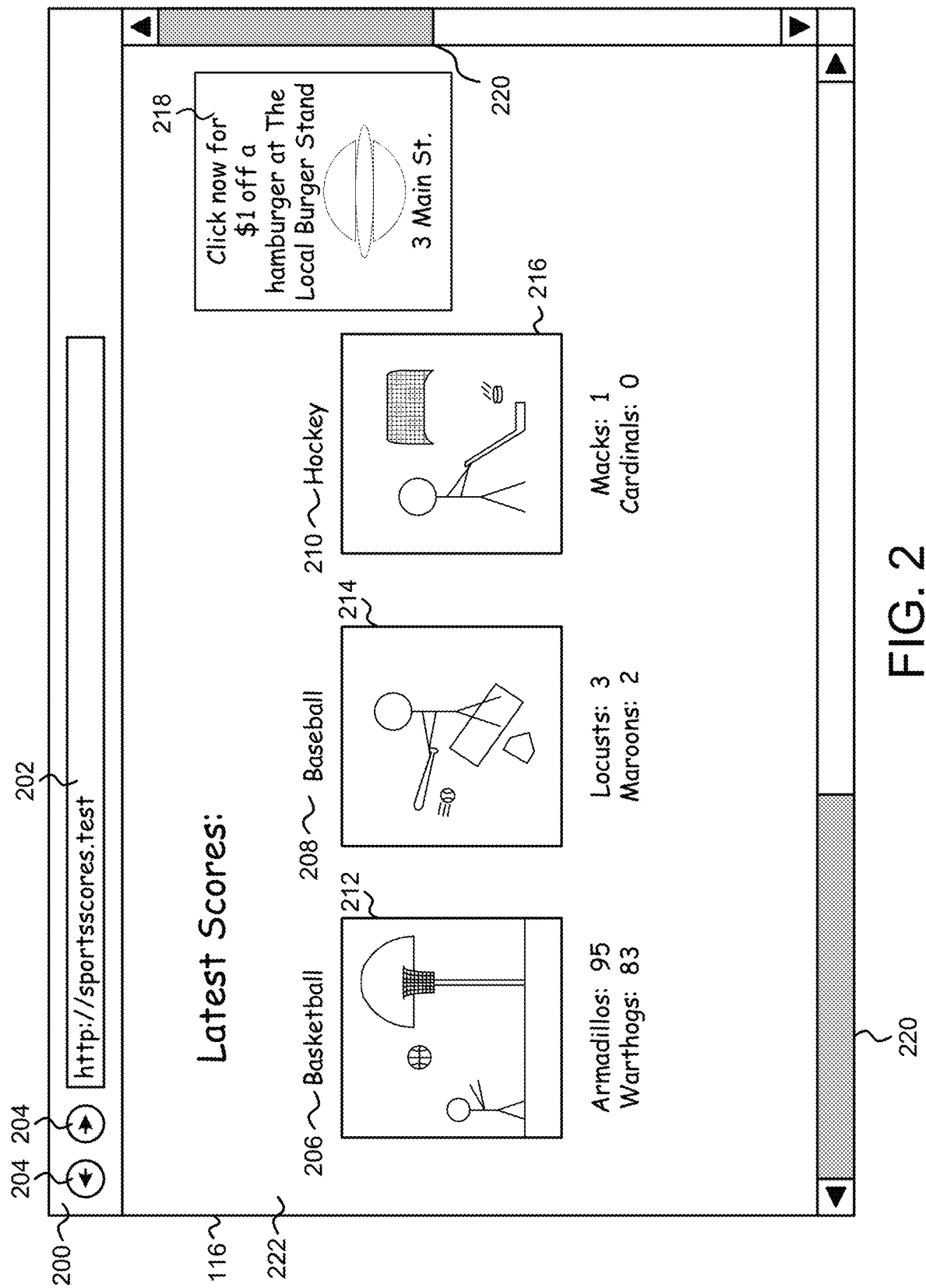
FIG. 2 is an illustration of an electronic display showing an example first-party webpage having third-party content.

Referring now to FIG. 2, an illustration is shown of electronic display 116 displaying an example first-party webpage 206. Electronic display 116 is in electronic communication with processor 112 which causes visual indicia to be displayed on electronic display 116. As shown, processor 112 may execute a web browser 200 stored in memory 114 of client device 102, to display indicia of content received by client device 102 via network 106. In other implementations, another application executed by client device 102 may incorporate some or all of the functionality described with regard to web browser 200 (e.g., a video game, a chat application, etc.).

Web browser 200 may operate by receiving input of a uniform resource locator (URL) via a field 202 from an input device (e.g., a pointing device, a keyboard, a touch screen, etc.). For example, the URL, http://www.example.org/weather.html, may be entered into field 202. Processor 112 may use the inputted URL to request data from a content source having a network address that corresponds to the entered URL. In other words, client device 102 may request first-party content accessible at the inputted URL. In response to the request, the content source may return webpage data and/or other data to client device 102. Web browser 200 may analyze the returned data and cause visual indicia to be displayed by electronic display 116 based on the data.

In general, webpage data may include text, hyperlinks, layout information, and other data that may be used to provide the framework for the visual layout of first-party webpage 206. In some implementations, webpage data may be one or more files of webpage code written in a markup language, such as the hypertext markup language (HTML), extensible HTML (XHTML), extensible markup language (XML), or any other markup language. For example, the webpage data in FIG. 2 may include a file, "weather.html" provided by the website, "www.example.org." The webpage data may include data that specifies where indicia appear on first-party webpage 206, such as text 208. In some implementations, the webpage data may also include additional URL information used by web browser 200 to retrieve additional indicia displayed on first-party webpage 206. For example, the file, "weather.html," may also include one or more instructions used by processor 112 to retrieve images 210-216 from their respective content sources.

Web browser 200 may include a number of navigational controls associated with first-party webpage 206. For example, web browser 200 may be configured to navigate forward and backwards between webpages in response to receiving commands via inputs 204 (e.g., a back button, a forward button, etc.). Web browser 200 may also include one or more scroll bars 220, which can be used to display parts of first-party webpage 206 that are currently off-screen. For example, first-party webpage 206 may be formatted to be larger than the screen of electronic display 116. In such a case, the one or more scroll bars 220 may be used to change the vertical and/or horizontal position of first-party webpage 206 on electronic display 116.

First-party webpage 206 may be devoted to one or more topics. For example, first-party webpage 206 may be devoted to the local weather forecast for Freeport, Me. In some implementations, a content selection server, such as content selection service 104, may analyze the contents of first-party webpage 206 to identify one or more topics. For example, content selection service 104 may analyze text 208 and/or images 210-216 to identify first-party webpage 206 as being devoted to weather forecasts. In some implementations, webpage data for first-party webpage 206 may include metadata that identifies a topic.

In various implementations, content selection service 104 may select some of the content presented on first-party webpage 206 (e.g., an embedded image or video, etc.) or in conjunction with first-party webpage 206 (e.g., in a pop-up window or tab, etc.). For example, content selection service 104 may select third-party content 218 to be included on webpage 206. In some implementations, one or more content tags may be embedded into the code of webpage 206 that defines a content field located at the position of third-party content 218. Another content tag may cause web browser 200 to request additional content from content selection service 104, when first-party webpage 206 is loaded. Such a request may include one or more keywords, a device identifier for client device 102, or other data used by content selection service 104 to select content to be provided to client device 102. In response, content selection service 104 may select third-party content 218 for presentation on first-party webpage 206.

According to various implementations, one or more content tags included in the webpage code for webpage 206 may cause web browser 200 to report location information to the content selection service as part of a content selection request. In some cases, an embedded script on webpage 206 may cause web browser 200 to access an application programming interface (API) of another application that determines the location of client device 102. For example, web browser 200 may relay location information to content selection service 104 via an API of a navigation program executed by client device 102. In further cases, web browser 200 may itself determine the location of client device 102 (e.g., web browser 200 may be configured to access location-determining hardware of client device 102). In yet another case, the location information reported by web browser 200 may be a network address or network access point that is used by content selection service 104 to determine a location of client device 102. For example, content selection service 104 may use a received IP address or a known WiFi hotspot to identify the location of client device 102.

Content selection service 104 may select third-party content 218 (e.g., an advertisement) by conducting a content auction, in some implementations. Content selection service 104 may also determine which third-party content providers compete in the auction based in part on account parameters set by the providers. For example, only content providers that specified a topic that matches that of webpage 206, an interest category of a device identifier accessing webpage 206, or a location associated with client device 102 may compete in the content auction. Based on bidding parameters for these third-party content providers, content selection service 104 may compare their bid amounts, quality scores, and/or other values to determine the winner of the auction and select third-party content 218 for presentation with webpage 206.

In some implementations, content selection service 104 may provide third-party content 218 directly to client device 102. In other implementations, content selection service 104 may send a command to client device 102 that causes client device 102 to retrieve third-party content 218. For example, the command may cause client device 102 to retrieve third-party content 218 from a local memory, if third-party content 218 is already stored in memory 114, or from a networked content source. In this way, any number of different pieces of content may be placed in the location of third-party content 218 on first-party webpage 206. In other words, one user that visits first-party webpage 206 may be presented with third-party content 218 and a second user that visits first-party webpage 206 may be presented with different content. Other forms of content (e.g., an image, text, an audio file, a video file, etc.) may be selected by content selection service 104 for display with first-party webpage 206 in a manner similar to that of third-party content 218. In further implementations, content selected by content selection service 104 may be displayed outside of first-party webpage 206. For example, content selected by content selection service 104 may be displayed in a separate window or tab of web browser 200, may be presented via another software application (e.g., a text editor, a media player, etc.), or may be downloaded to client device 102 for later use.

Figure 3:
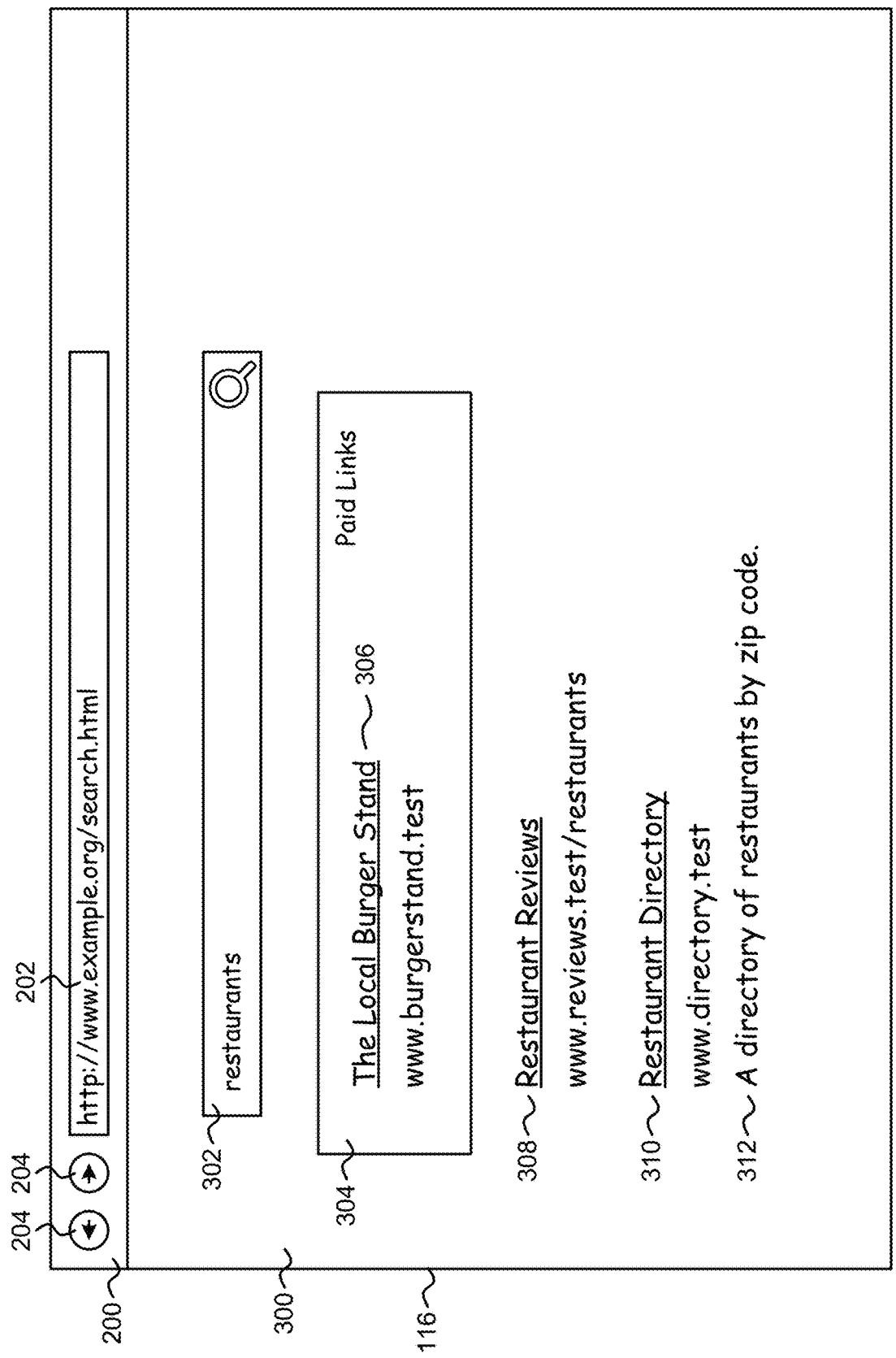
FIG. 3 is an illustration of an electronic display showing first-party search results with third-party content.

Referring now to FIG. 3, an illustration is shown of electronic display 116 showing first-party search results with third-party content. Similar to webpage 206 in FIG. 2, client device 102 may access a first-party search engine via network 106 by executing a web browser 200. In other implementations, the search engine may provide search results for display by client device 102 within a stand-alone application. For example, a navigation application executed by client device 102 may include a search feature that allows search results from the search engine to be presented within the application.

As shown, the first-party search engine accessed by client device 102 may provide a webpage 300 to client device 102 that is configured to allow for searches and search results to be updated on the fly. For example, webpage 300 may include a search field 302 that receives a search query and webpage 300 may also display search results obtained using the query. In other implementations, search field 302 may be displayed separately from the search results (e.g., search field 302 and the search results may appear on different webpages, screens, etc.). Search field 302 is generally configured to receive one or more search terms to be searched by the search engine. For example, the search term "restaurants" may be entered into search field 302 and used to search for links to online resources devoted to restaurants. A search query may be entered into search field 302 via a touch screen display, keyboard, a microphone (e.g., via voice recognition), or another user interface device of client device 102.

In response to receiving the search query entered into search field 302, the search engine may retrieve any number of links to websites or other online services regarding the query. For example, the search engine may retrieve the URLs of websites devoted to the topic of restaurants and provide them as hyperlinks 308, 310 on webpage 300 as search results. In some implementations, the search engine may maintain an index of keywords used on webpages or other resources. Search results may then be ordered by the search engine based on the relevancy of the indexed webpages relative to the search query. A summary of the webpage or other resource may also be provided on webpage 300 by the search engine. For example, hyperlink 310 may have an associated description 312 that gives more detail about the linked webpage. Since hyperlinks 308, 310 are presented as search results based solely on their relevancy to the search query, they may be considered first-party content.

In addition to webpage 300 including hyperlinks 308, 310 as search results, webpage 300 may also include third-party content 304 selected by content selection service 104. Third-party content 304 may be, in one example, a hyperlink 306 to a third-party content provider's website. Third-party content 304 may also identify itself as being third-party content, such as including a notification that the hyperlink is a paid link. Other forms of third-party content that may be presented in conjunction with search results may include a location (e.g., the location of the nearest restaurant to client device 102) or links to perform online actions, such as playing a piece of media content.

Content selection service 104 may conduct a content auction to select third-party content 304. In response to the search query entered into search field 302, content selection service 104 may first determine which third-party content providers are to compete in a content auction. For example, only third-party content providers that specify the search term "restaurants" may participate in the content auction. Another parameter may also be used to control which third-party content providers participate in the auction includes the geographic location of client device 102. Such a geographic location may correspond to a particular city, zip code, state, country, or other area. For example, a third-party advertiser located in Great Britain may only be interested in advertising to client devices located there and not in the United States of America.

According to various implementations, content selection service 104 may generate a content auction bid on behalf of a third-party content provider via an autobidder function. For example, content selection service 104 may generate an auction bid for the third-party content provider associated with content 304 using auction parameters, such as a maximum bid amount for search content. Based on the bid amounts submitted in the auction, content selection service 104 may determine which third-party content providers have the opportunity to place third-party content with the first-party search results on webpage 300.

Figure 4:
FIG. 4 is an illustration of one implementation of an auction bid report for a third-party content provider.

Referring now to FIG. 4, an illustration is shown of one implementation of an auction bid report 400 for a third-party content provider. As shown, auction bid report 400 may include any number of metrics regarding the performance of a third-party content provider that uses a content selection service. For example, report 400 may be provided by content selection service 104 shown in FIG. 1 to a device of a third-party content provider. While auction bid report 400 is generally shown as a table, other visual formats may be used in other implementations. For example, an auction bid report may include various fields, charts (e.g., pie charts, bar graphs, etc.), or the like to display metrics regarding a third-party content provider's account.

Auction bid report 400 may include a column 402 that lists one or more campaigns of a third-party content provider. Auction bid report 400 may also include a column 404 that lists a content type of first-party content with which the third-party content is provided. For example, one content type may be display content and another content type may be search content. Auction bid report 400 may also include various columns that display auction metrics for the various campaigns and content types. For example, auction bid report 400 may include a column 406 that shows the provider's maximum CPC bid amount used, a column 408 that shows the number of clicks on the provider's content in a given time period, a column 410 that shows the number of impressions of the provider's content (e.g., the number of times the provider's content was shown), a column 412 that shows a click-through-rate based on the number of impressions and clicks, a column 414 that shows the average CPC for the content placements, and/or a column 416 that shows a cost amount associated with the content placements.

As shown, report 400 may include any number of entries that combine campaigns, content types, and/or any other factors that may be used to logically group auction metrics (e.g., campaigns broken down by country, language, topical category, or combinations thereof). For example, assume that the third-party content provider operates a number of restaurants named "The Local Burger Stand." In such a case, entry 418 of report 400 may correspond to an advertising campaign that promotes the restaurant located on Main St. by placing advertisements with first-party display content. For example, the campaign may be used by content selection service 104 to place an advertisement (e.g., third-party content 218) on display content webpage 206 shown in FIG. 2. Entry 420 of report 400 may also correspond to a campaign promoting the Main St. restaurant location by placing third-party content with first-party search results. For example, third-party content 304 shown in FIG. 3 may be selected and provided with the first-party search results on webpage 300 based on the corresponding campaign. In another example, report 400 may include an entry 422 for a different search campaign that promotes the provider's restaurant located on State Street.

The average CPCs shown in column 414 may differ across the various content types shown in column 404. For example, the average CPC in entry 418 for display content may be $2 while the average CPC in entry 420 for search content may be $1, despite both entries promoting the same restaurant location and using similar auction parameters. Thus, from the standpoint of the content provider, the search-related content placements are significantly cheaper than that of the placements associated with display content. In some cases, the content provider may drop the display campaign entirely or be left with the impression that the autobidder function is not performing properly.

Figure 5:
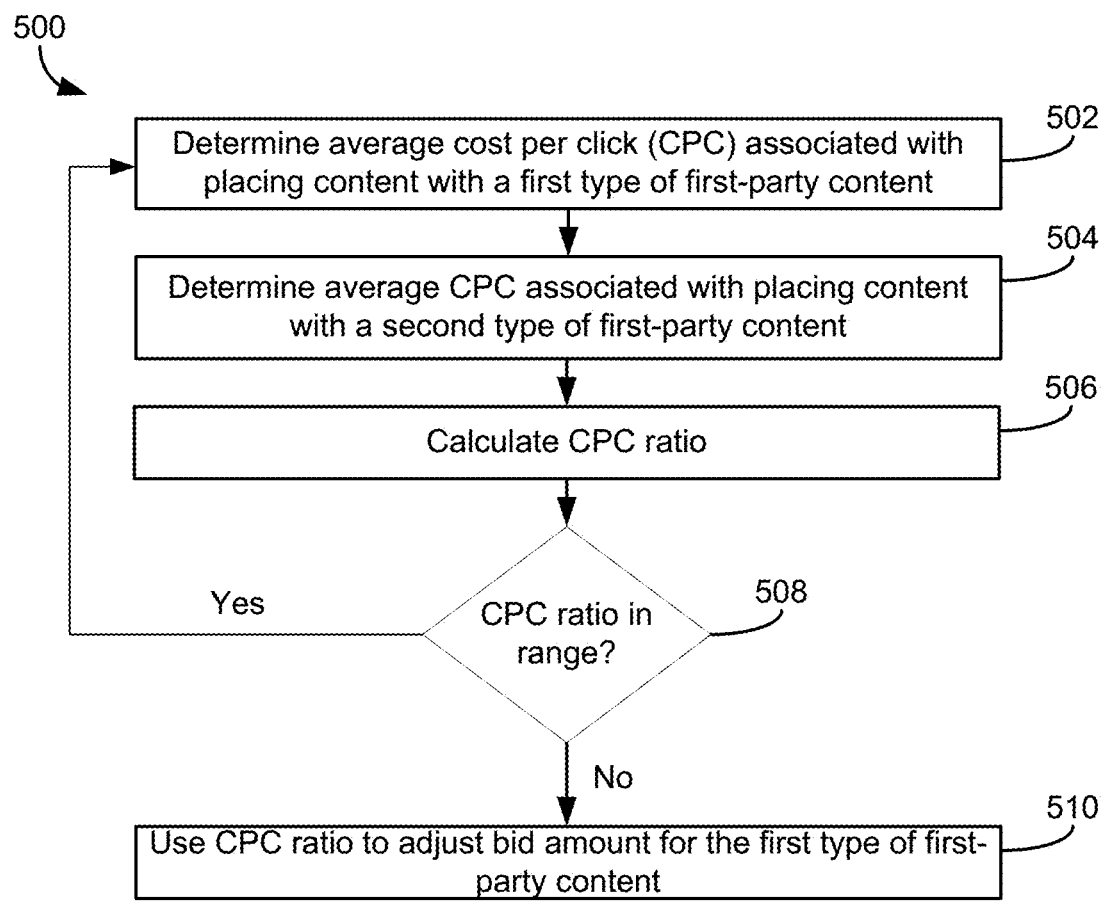
FIG. 5 is a flow diagram of one implementation of a process for adjusting a content auction bid.
Figure 6:
FIG. 6 is an illustration of one implementation of an auction bid report showing an adjusted auction bid value.

Referring now to FIG. 5, a flow diagram is shown of one implementation of a process 500 for adjusting a content auction bid. As shown, process 500 includes determining an average CPC associated with placing content with a first content type (step 502), determining an average CPC associated with placing content with a second content type (step 504), calculating a CPC ratio between the two content types (step 506), determining whether the CPC ratio is within an acceptable range (step 508), and using the CPC ratio to adjust a bid amount for the first type of content (step 510). Process 500 may be implemented by one or more computing devices, such as content selection service 104 shown in FIG. 1. In general, process 500 allows the CPC ratio of a third-party content provider to be adjusted within a desired range.

Still referring to FIG. 5 and in more detail, process 500 includes determining an average CPC associated with placing third-party content with a first type of first-party content (step 502). In various implementations, the first-party content may be categorized according to any number of different content types such as search content, display content, mobile application content, TV content, or the like. For example, an average CPC may be calculated based on the placement of advertisements with display-type websites. In one implementation, the average CPC may be calculated using a threshold number of clicks on the third-party content. For example, if less than fifty clicks have occurred on the provider's content, the average CPC may not be calculated. In one implementation, the average CPC may be calculated by including clicks from a higher level of a logical hierarchy representing the provider's account or campaign. For example, if the number of requisite clicks is not available to determine an average CPC for a particular country, clicks may be included in the calculation for that country and for a particular language.

The average CPC for the first content type may be calculated using auction results from any time period. For example, the average CPC calculated in step 502 may be computed using auction result data from the previous day, week, month, year, multiple time periods (e.g., a history of auction results over Thanksgiving), or any other set of one or more time periods. In some cases, multiple CPC values may be calculated across different time periods. For example, daily, weekly, and biweekly average CPC values may be calculated for a given content provider.

Yet still referring to FIG. 5, process 500 includes calculating an average CPC value associated with placing content with a second type of first-party content (step 504). In some implementations, the content placements analyzed in steps 502 and 504 may be part of the same campaign or may be associated in a similar way (e.g., based on auction parameters used to provide the third-party content). For example, the content placements analyzed in steps 502 and 504 may be part of a simplified advertising campaign that places third-party content with display content (e.g., display-based webpages) and with search content. The average CPC calculated in step 504 may be based on auction result data from any time period or from multiple time periods. In some implementations, the average CPC calculated in step 504 may be based on a threshold number of clicks. If the threshold number of clicks is not available from a particular grouping of data, a larger grouping may be analyzed instead. According to various implementations, the CPC values calculated in steps 502 and 504 may also be based on raw auction result data (e.g., based on the submitted bids in the auctions) or may be based on actual auction result data (e.g., based on what the content provider actually paid due to discounts, etc.).

Still referring to FIG. 5, process 500 includes calculating a CPC ratio across the two content types (step 506). The CPC ratio may be calculated by dividing the CPC value from step 502 by the CPC value from step 504, in various implementations. For example, the average CPC for display-related content may be divided by the average CPC for search-related content, to determine the CPC ratio.

Yet still referring to FIG. 5 and in more detail, process 500 includes determining whether the CPC ratio is within a predefined range (step 508). The predefined range may be defined by one or more threshold values. For example, the system may determine whether the CPC ratio is between 0.8 and 1.2, corresponding to a deviation of +/−20% from an exact proportion of CPC values for the two content types. In various implementations, the analyzed range may differ depending on whether the CPC values used to calculate the CPC ratio are raw CPC values (e.g., prior to factoring in any price adjustments) or on actual CPC values. If the CPC ratio is within the accepted range, process 500 may return to step 502 and steps 502-508 may be repeated any number of times. For example, steps 502-508 may be repeated as part of a nightly batch job to evaluate the performance of the third-party content provider. However, if the CPC ratio evaluated in step 508 is not within the predefined range, process 500 may proceed to step 510 for further processing.

Still referring to FIG. 5, process 500 includes using the CPC ratio to adjust the bid amount for the first content type (step 510). In various implementations, the CPC ratio may be used to determine an adjustment factor (e.g., a value k) that adjusts the maximum bid amount associated with the first content type. For example, the adjustment factor may be multiplied by the recent CPC for one content type to determine the maximum bid amount for the other content type (e.g., $max\_bid_{display}=k*CPC_{search}$). In one implementation, the CPC ratio may be compared to an ideal CPC ratio, to determine a new adjustment factor. For example, assume that the ideal CPC ratio between display and search content is 1.0 and that the actual CPC ratio is 1.6. If the current adjustment factor is 0.8 (e.g., k=0.8), the adjustment factor may be lowered, thereby also lowering the maximum bid for display content, the CPC for the display content, and the CPC ratio. According to various implementations, a smoothing factor may also be employed to change the adjustment factor used to determine a new maximum bid amount for a content type. Such a smoothing factor may be used to remove the effects of sudden CPC changes, oscillations in a CPC, or the like.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In further implementations, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A method to adjust a rate of display between different types of content item categories, the method comprising:
    determining that a first count of presentations of content items of a first category of content displayed with a first type of first-party content is above a predefined range, the content items of the first category of content having a set of display parameters and associated with a first content provider;
    determining that a second count of presentations of content items of a second category of content displayed with a second type of first-party content and is within the predefined range, the content items of the second category of content associated with the first content provider;
    identifying a ratio between the first count of presentations and the second count of presentations;
    identifying a threshold range indicating a first threshold and a second threshold;
    determining, based on the ratio between the first count of presentations and the second count of presentations not being between the first threshold and the second threshold, that the ratio does not satisfy the threshold range;
    determining, responsive to the ratio not satisfying the threshold range and based on the ratio between the first count of presentations and the second count of presentations, an adjustment factor for a rate of display of the content items of the first category of content;
updating the set of display parameters associated with the first category of content based at least on the adjustment factor;
receiving a request for content from a client device;
initiate a selection process for responding to the request for, the selection process identifying a content item;
determining, as part of the selection process, that the content item is associated with the first category of content;
using, responsive to the determination that the content item is associated with the first category of content, the updated set of display parameters associated with the first category of content for the content item as part of the selection process;
selecting, via the selection process and using the updated set of display parameters associated with the first category of content, the content item for responding to the request for content; and
providing, to the client device, a response to the request for content including the selected content item.

2. The method of claim 1, comprising:
generating, with the updated set of display parameters, a third count of presentations of the content items of the first category of content with the first type of first-party content.

3. The method of claim 2, comprising:
determining the third count of presentations of the content items of first category of content is within the predefined range.

4. The method of claim 1, comprising:
calculating a weighted ratio between the first count of presentations and the second count of presentations.

5. The method of claim 4, comprising:
determining the adjustment factor based on the weighted ratio between the first count of presentations and the second count of presentations.

6. The method of claim 1, comprising:
determining the updated display parameters are not proportional to the first count of presentations of the content items of the first category of content with a first type of first-party content.

7. The method of claim 6, comprising:
applying, responsive to determining the updated display parameters are not proportional to the first count of presentations of the content items of the first category content, a smoothing function to the adjustment factor.

8. The method of claim 7, wherein the smoothing factor reduces the effect of the adjustment factor on updating the display parameters.

9. The method of claim 1, comprising:
adding a momentum term to the adjustment factor, wherein the momentum term comprises a previously calculated adjustment factor.

10. The method of claim 1, comprising:
determining the adjustment factor based on a predetermined calculation schedule.

11. A system to adjust a rate of display between different types of content item categories, the system comprising one or more processors that:
determine that a first count of presentations of content items of a first category of content displayed with a first type of first-party content is above a predefined range, the content items of the first category of content having a set of display parameters and associated with a first content provider;
determine that a second count of presentations of content items of a second category of content displayed with a second type of first-party content is within the predefined range, the content items of the second category of content associated with the first content provider;
identify a ratio between the first count of presentations and the second count of presentations;
identify a threshold range indicating a first threshold and a second threshold;
determine, based on the ratio between the first count of presentations and the second count of presentations not being between the first threshold and the second threshold, that the ratio does not satisfy the threshold range;
determine, responsive to the ratio not satisfying the threshold range and based on the ratio between the first count of presentations and the second count of presentations, an adjustment factor for a rate of display of the content items of the first category of content;
update the set of display parameters associated with the first category of content based at least on the adjustment factor;
receive a request for content from a client device;
initiate a selection process for responding to the request for, the selection process identifying a content item;
determine, as part of the selection process, that the content item is associated with the first category of content;
use, responsive to the determination that the content item is associated with the first category of content, the updated set of display parameters associated with the first category of content for the content item as part of the selection process;
select, via the selection process and using the updated set of display parameters associated with the first category of content, the content item for responding to the request for content; and
provide, to the client device, a response to the request for content including the selected content item.

12. The system of claim 11, wherein the one or more processors:
generate, with the updated set of display parameters, a third count of presentations of the content items of the first category of content with the first type of first-party content.

13. The system of claim 12, wherein the one or more processors:
determine that the third count of presentations of the content items of the first category of content is within the predefined range.

14. The system of claim 11, wherein the one or more processors:
calculate a weighted ratio between the first count of presentations and the second count of presentations.

15. The system of claim 14, wherein the one or more processors:
determine the adjustment factor based on the weighted ratio between the first count of presentations and the second count of presentations.

16. The system of claim 11, wherein the one or more processors are operable to:
determine the updated display parameters are not proportional to the first count of presentations of the content items of the first category of content with a first type of first-party content.

17. The system of claim 16, wherein the one or more processors:
  apply, responsive to the updated display parameters not being proportional to the first count of presentations of the content items of the first category content, a smoothing function to the adjustment factor.

18. The system of claim 17, wherein the smoothing factor is configured to reduce the effect of the adjustment factor on updating the display parameters.

19. The system of claim 11, wherein the one or more processors:
  add a momentum term to the adjustment factor, wherein the momentum term comprises a previously calculated adjustment factor.

20. The system of claim 11, wherein the one or more processors:
  determine the adjustment factor based on a predetermined calculation schedule.

* * * * *